Patented Apr. 14, 1953

2,635,035

UNITED STATES PATENT OFFICE 2,635,035

PREPARATION OF URANIUM BROMIDE

Jack E. Powell, Ames, Iowa, assignor to the United States of America as represented by the United States Atomic Energy Commission No Drawing. Application June 5, 1946, Serial No. 674,653

3 Claims. (Cl. 23—14.5)

This invention is concerned with the production of uranium tetrabromide (UBr$_4$). In accordance with the present invention it has been found that UBr$_4$ may be prepared by bromination of a binary compound of uranium and sulphur or nitrogen. The process may be conducted in a simple manner at an elevated temperature, the particular temperature required being dependent upon the rate of reaction desired and the nature of the compound undergoing bromination. For example, uranium sulphide, such as US$_2$, may be brominated by reaction of elemental bromine at a temperature above about 150° C. This reaction apparently proceeds in accordance with the equation

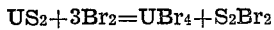
$$US_2 + 3Br_2 = UBr_4 + S_2Br_2$$

On the other hand, when uranium nitride is brominated somewhat higher temperatures approximating dull red heat or above, usually above about 450° C., are generally necessary in order to secure a reasonably rapid reaction. The reaction in this case apparently proceeds in accordance with the following equation:

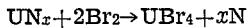
$$UN_x + 2Br_2 \rightarrow UBr_4 + xN$$

where $x$ is a number denoting the number of atoms of nitrogen which is present per atom of uranium in the uranium nitride.

The process may be conducted in a convenient apparatus in which a bed of the uranium sulphide or uranium nitride may be established and gaseous bromine or a mixture of gaseous bromine and an inert gas, such as nitrogen or argon, allowed to pass through the bed of uranium compound. The apparatus should also be provided with a suitable condenser, usually an air-cooled condenser, which may or may not be heated. This condenser may be used to recover the uranium bromide which is formed. Also suitable provision should be made to exclude oxygen from the reaction and in general it is desirable to flush the reactor with an inert gas, such as nitrogen, in order to remove air before the process is begun.

Where the temperature of the reaction is maintained below about 600° C. the UBr$_4$ is formed in solid state. However, if the bromination is conducted at a temperature above about 600° C. but below the temperature of decomposition of UBr$_4$, the UBr$_4$ sublimes and is collected in the condenser. Thus the bromination may be conducted in two ways, i. e., the uranium compound may be brominated at a temperature below 600° C. and the reactor thereafter heated to sublime UBr$_4$, or the bromination may be conducted above 600° C. and the UBr$_4$ sublimed substantially as formed.

The process may be conducted using various nitrides or sulphides of uranium including U$_2$S$_3$ and US$_2$ and nitrides having the composition UN$_x$ where $x$ ranges between 1 and 2. The following examples are illustrative.

Example 1

A quantity of finely divided US$_2$ was distributed in a quartz reactor so as to form a porous bed. The reactor was flushed with nitrogen in order to remove air. A mixture of bromine and nitrogen, formed by bubbling nitrogen through liquid bromine, was introduced in the bottom of the bed and allowed to flow through the bed and the products of reaction allowed to flow out of the reactor and into an air-cooled condenser. During passage of the bromine through the US$_2$ the reactor was heated to 300° C. and passage of bromine was continued until sulphur bromide ceased to be evolved. At this point the temperature was raised to about 450° C. to drive off the residue of sulphur bromide. Thereafter, the temperature was raised to about 600 to 700° C. and the resulting UBr$_4$ was sublimed into the air-cooled condenser.

Example 2

A bed of uranium nitride having the composition UN$_{1.75}$ was placed in a quartz reactor to establish a porous bed. The reactor was flushed with nitrogen in order to remove oxygen. A stream of gaseous bromine and nitrogen, formed by bubbling nitrogen through liquid bromine, was introduced into the bottom of the bed and allowed to flow therethrough while the uranium nitride was heated to a temperature of about 650 to 700° C. The products of reaction were carried out of the reactor and into an air-cooled condenser where they were condensed. The process was continued until the uranium nitride was substantially completely consumed and the uranium tetrabromide was recovered in the condenser.

Although the invention has been described with reference to the use of bromine as a brominating agent, other brominating agents such as HBr may be used in lieu of or in conjunction with elemental bromine.

Although the present invention has been described with particular reference to the specific details of certain embodiments thereof, it is not intended that such details shall be regarded as limitations upon the scope of the invention except insofar as included in the accompanying claims.

What is claimed is:

1. A method of preparing $UBr_4$ which comprises reacting a nitride of uranium at a temperature above about 450° C. with bromine and recovering $UBr_4$.

2. A method of preparing $UBr_4$ which comprises reacting uranium nitride ($UN_{1.75}$) at a temperature above about 450° C. with bromine and recovering said $UBr_4$.

3. A method of preparing $UBr_4$ which comprises reacting uranium nitride ($UN_{1.75}$) at a temperature in excess of 600° C. with bromine and collecting sublimed $UBr_4$ as formed.

JACK E. POWELL.

References Cited in the file of this patent

UNITED STATES PATENTS

| Number | Name | Date |
|---|---|---|
| 2,427,360 | Kroll | Sept. 16, 1947 |

OTHER REFERENCES

Colani, Annales de Chimie et de Physique, Sec. 8, vol. 12, p. 88, (1907).

Mellor, Comprehensive Treatise of Inorganic and Theoretical Chemistry, vol. 8 pp. 130 (published 1928, reprinted 1947), Longmans, Green and Co., London.

Colani, Annales de Chimie et de Physique, Ser. 8, vol. 12, p. 83 (1907).

Mellor: "Comprehensive Treatise on Inorganic and Theoretical Chemistry," vol. 12, 1932, p. 95.